Oct. 18, 1932.  E. J. SVENSON  1,883,084
MACHINE TOOL
Filed Jan. 7, 1928  9 Sheets-Sheet 1

Inventor:
Ernest J. Svenson,
By Chindahl Parker Carlson
Attys.

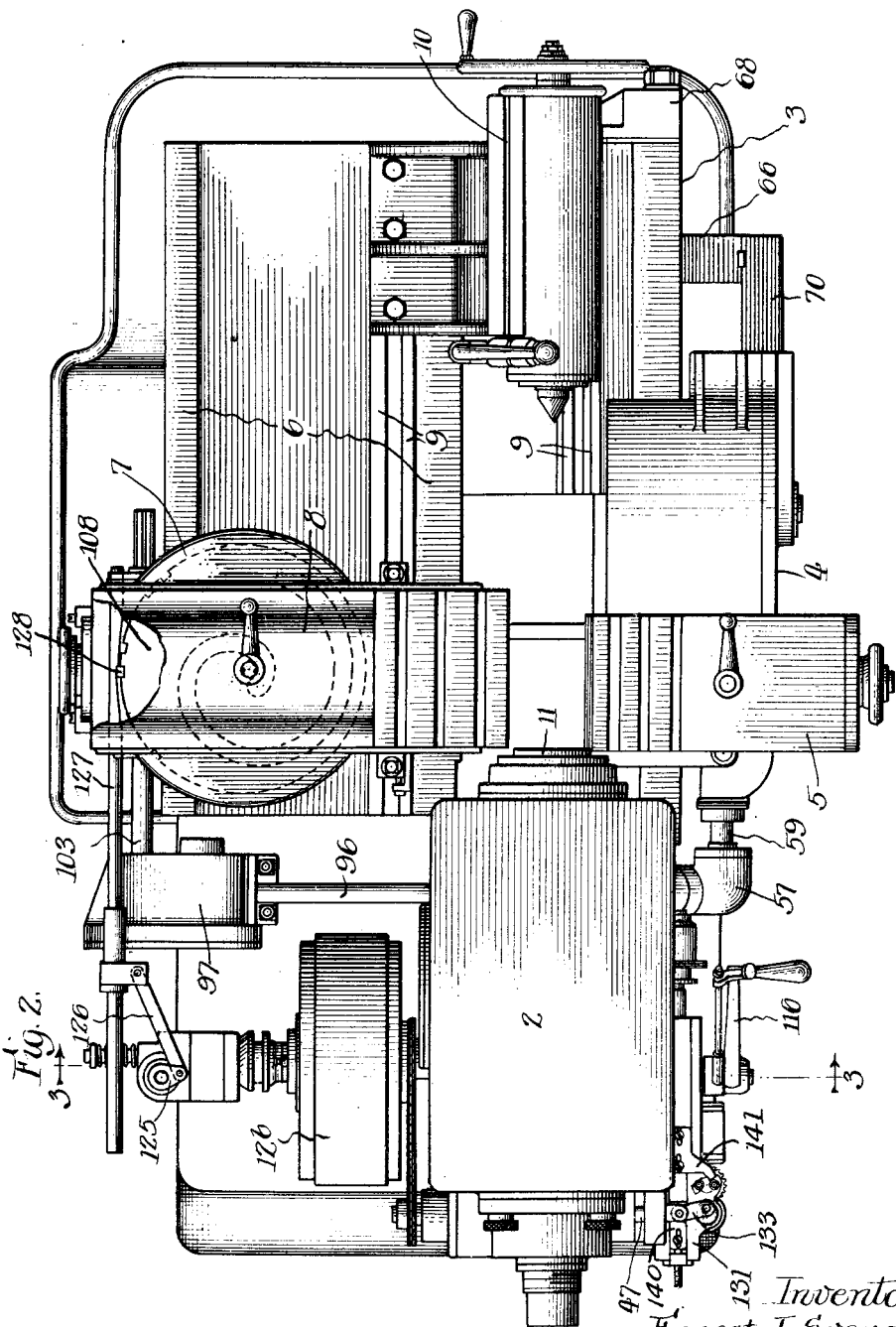

Oct. 18, 1932.  E. J. SVENSON  1,883,084
MACHINE TOOL
Filed Jan. 7, 1928  9 Sheets-Sheet 3
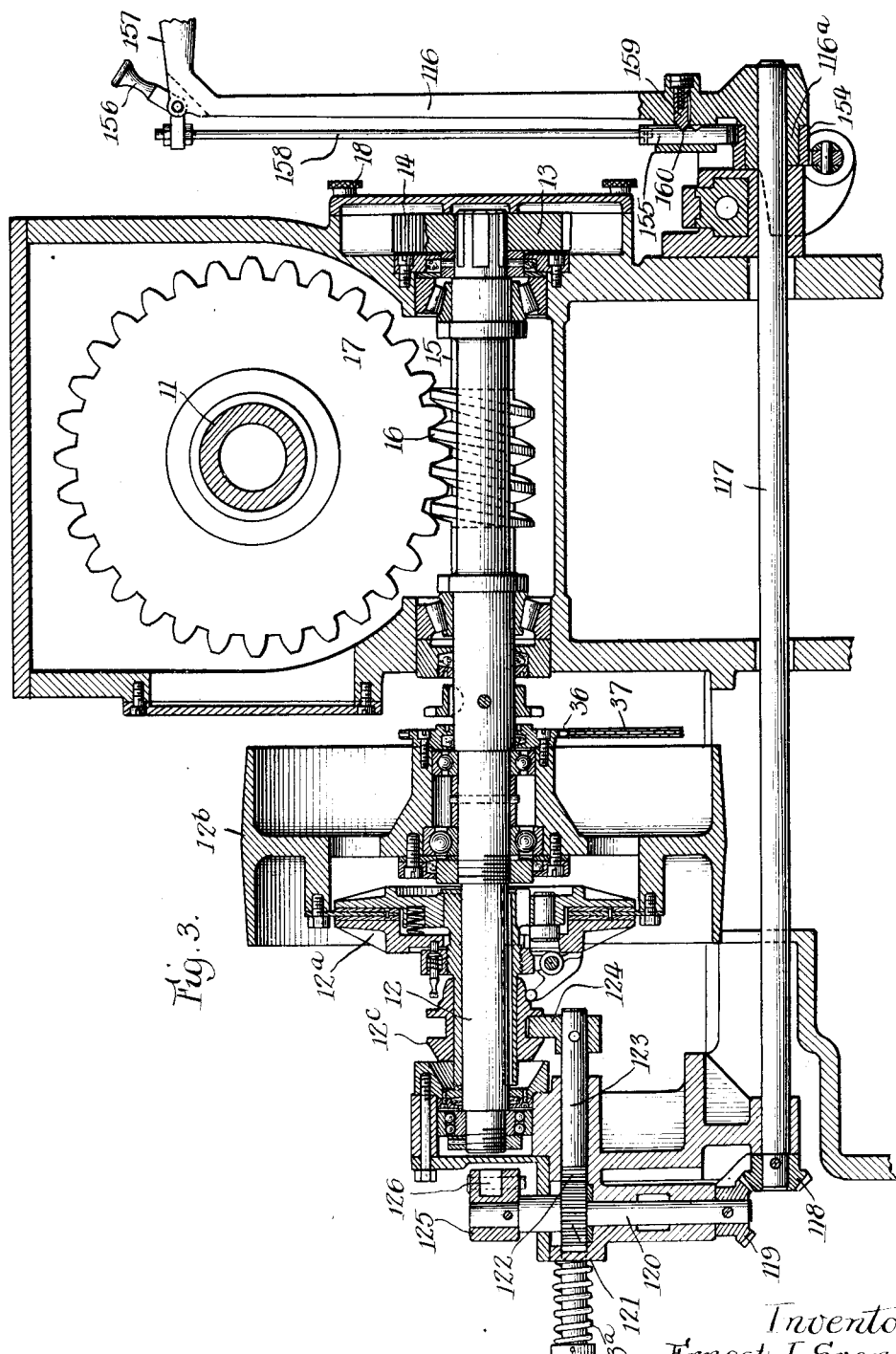

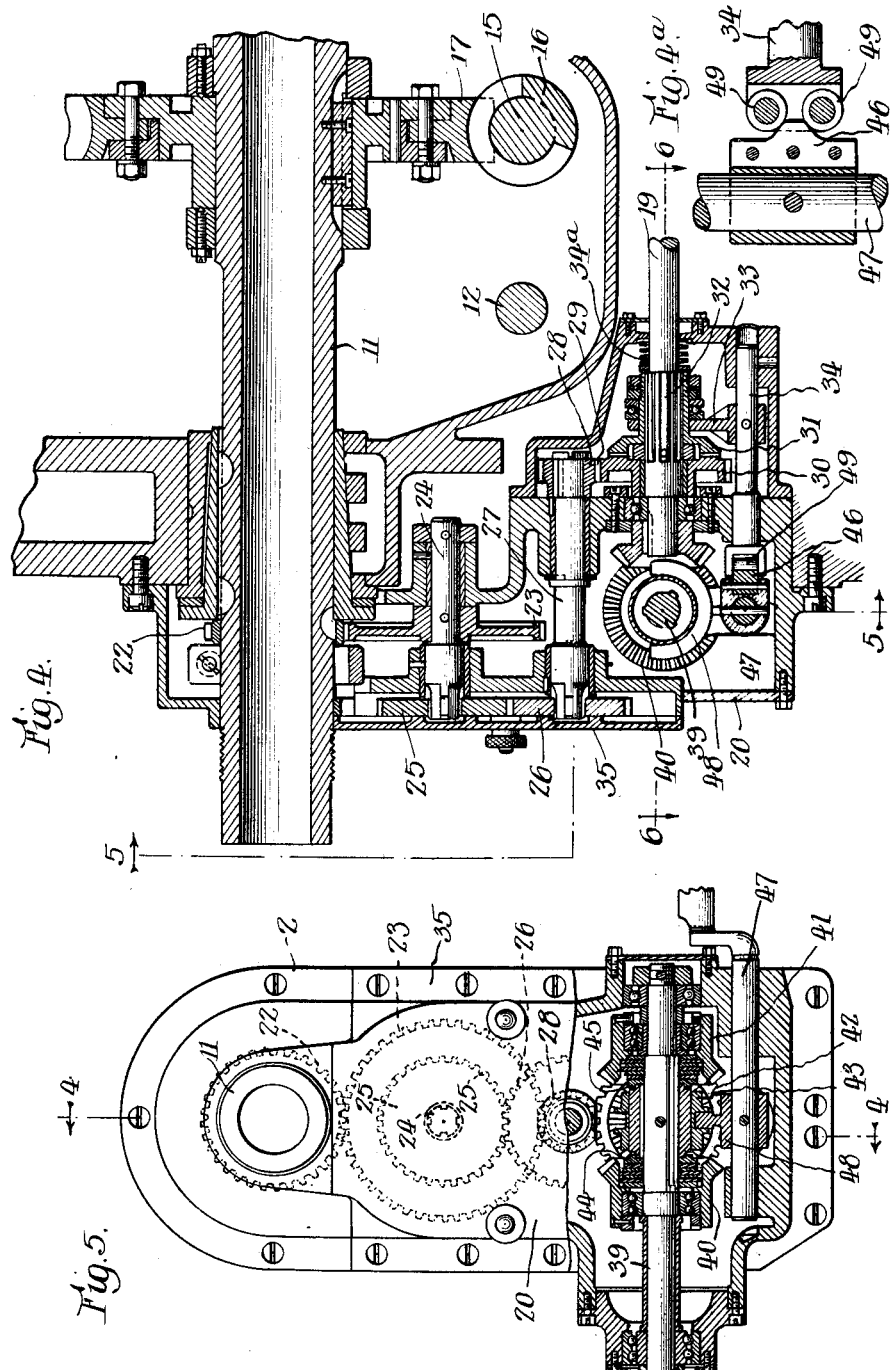

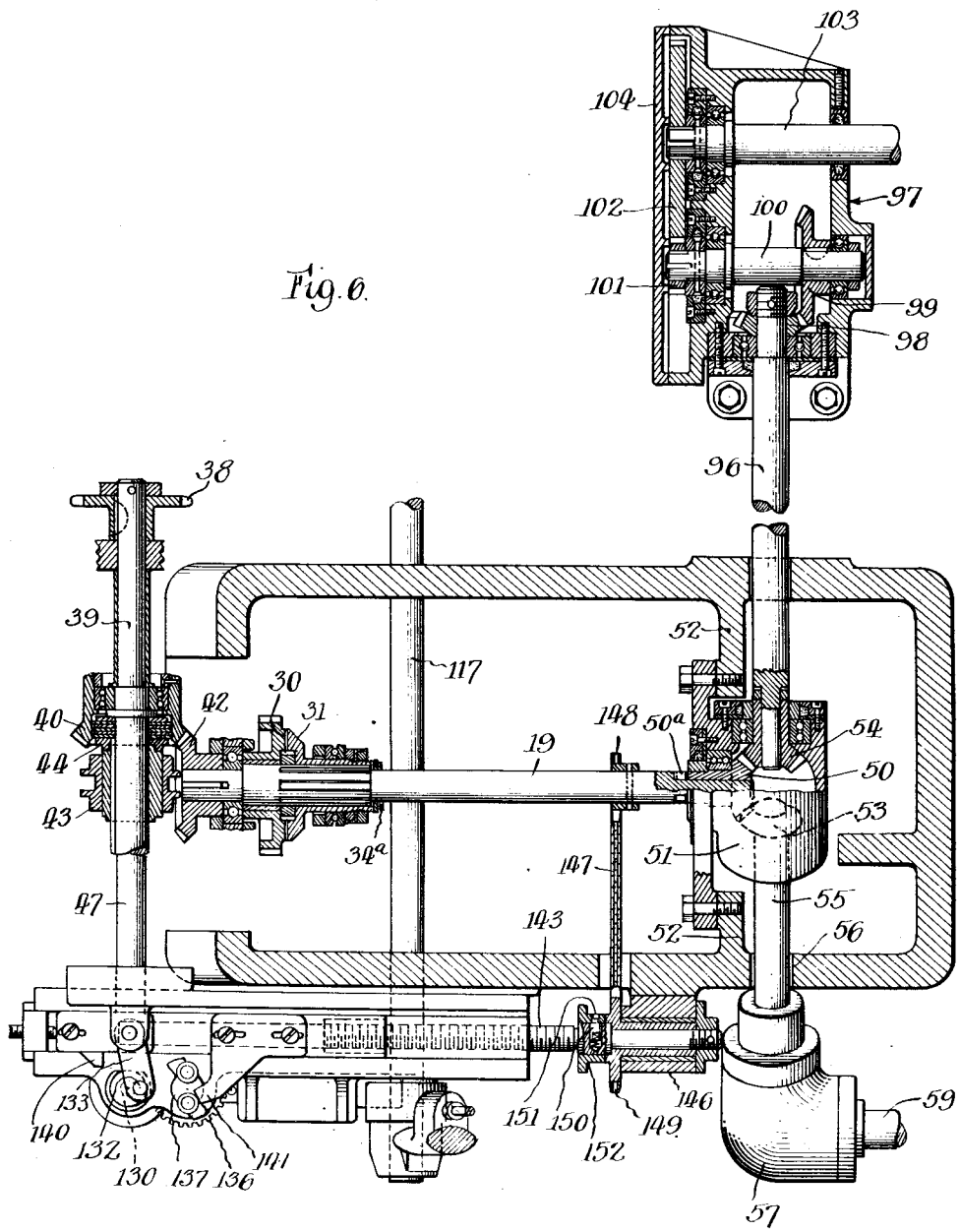

Oct. 18, 1932.  E. J. SVENSON  1,883,084
MACHINE TOOL
Filed Jan. 7, 1928  9 Sheets-Sheet 6
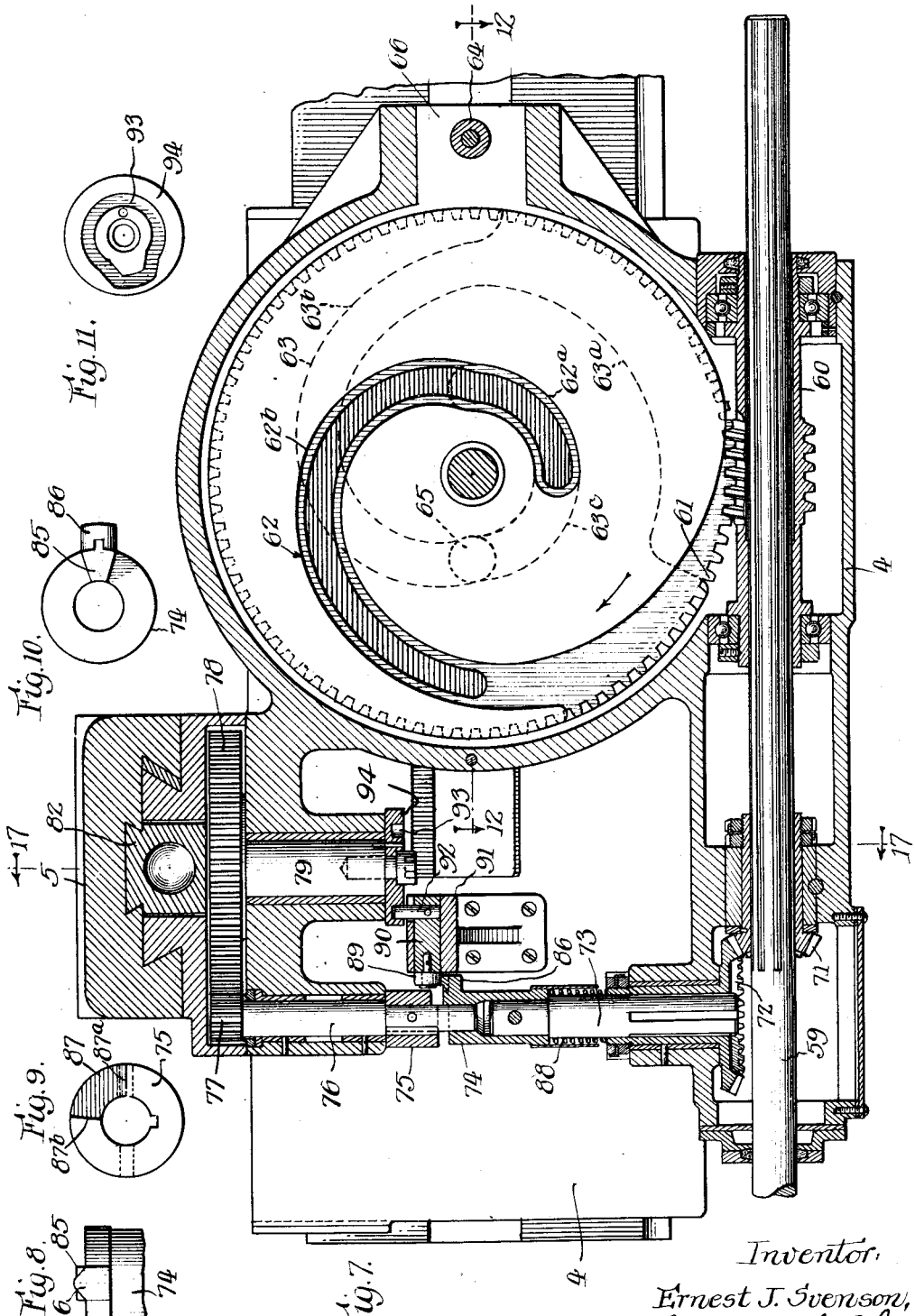

Oct. 18, 1932.   E. J. SVENSON   1,883,084
MACHINE TOOL
Filed Jan. 7, 1928   9 Sheets-Sheet 7
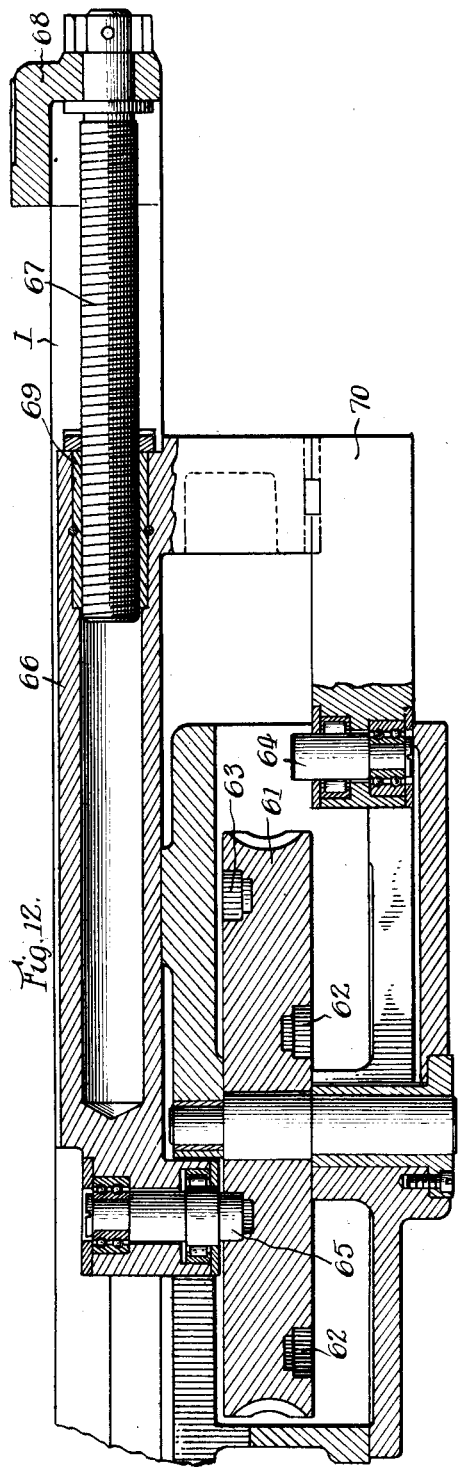
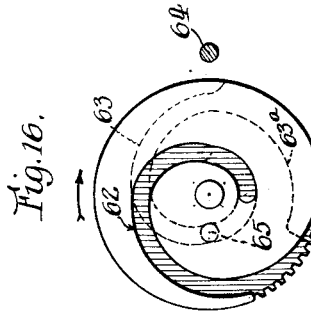
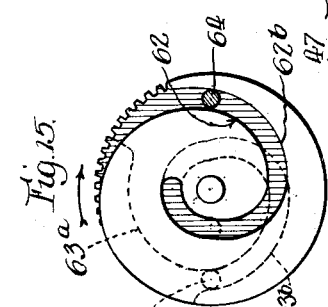
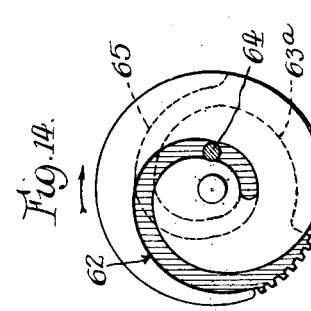
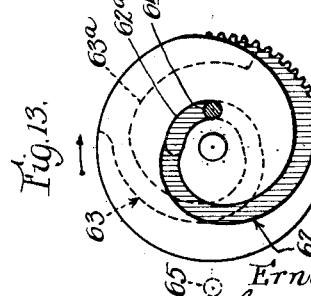
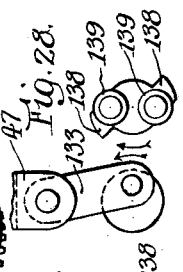
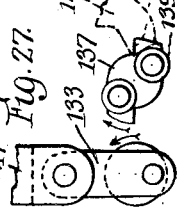
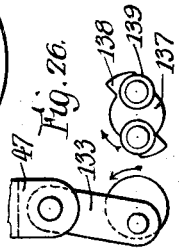
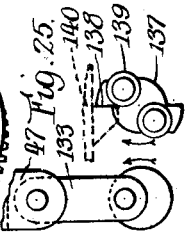
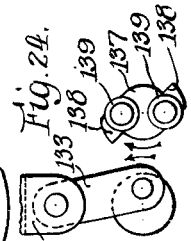

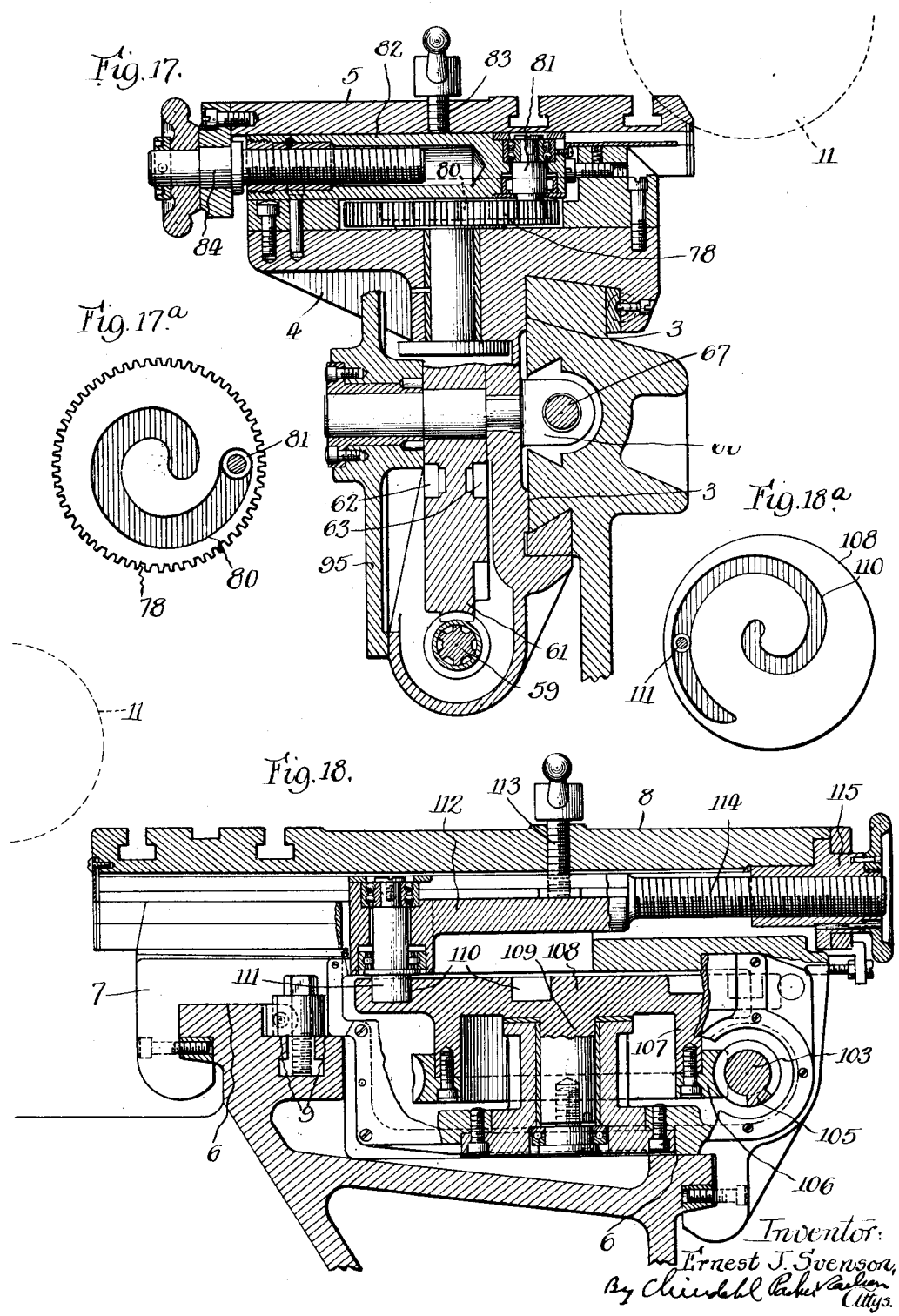

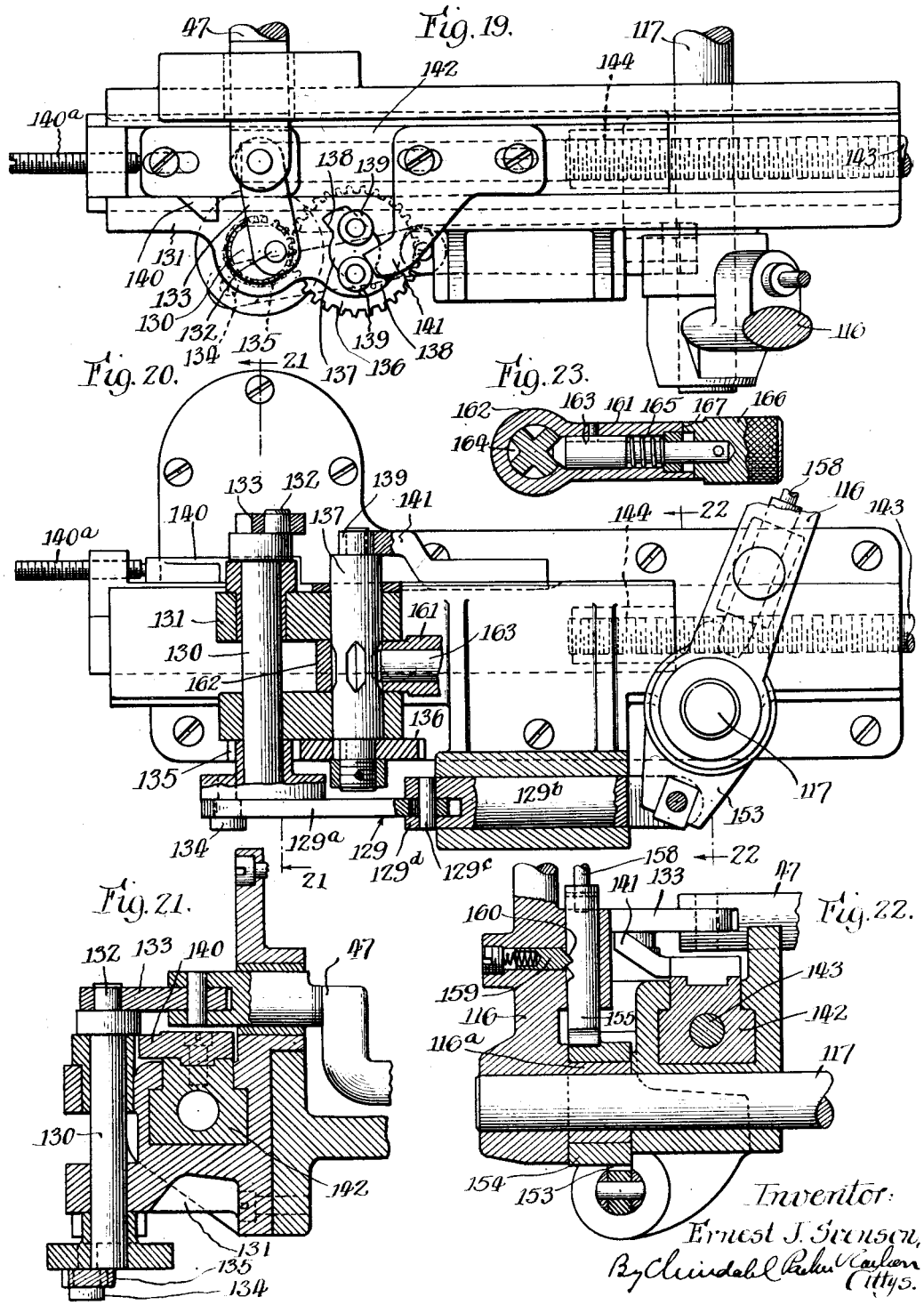

Patented Oct. 18, 1932

1,883,084

UNITED STATES PATENT OFFICE

ERNEST J. SVENSON, OF ROCKFORD, ILLINOIS, ASSIGNOR TO SUNDSTRAND MACHINE TOOL CO., OF ROCKFORD, ILLINOIS, A CORPORATION OF ILLINOIS

MACHINE TOOL

Application filed January 7, 1928. Serial No. 245,168.

The invention relates to machine tools and more particularly to an automatic lathe adapted to perform a plurality of operations on a work piece and provide a high rate of production.

It is the general object of the invention to provide an automatic lathe universal in character, that is, a lathe having the speed and accuracy of operation of an automatic single purpose machine, but so constructed that it has numerous advantages of a general purpose machine in that it permits of convenient and rapid set up and efficient operation for various kinds of work.

Another object of the invention is to provide an automatic lathe of improved construction embodying means for driving a front carriage, and front and rear cross slides, at feed and traverse rates.

Another object of the invention is to provide a lathe with mechanism for driving a cross slide which permits the slide to be fed in to a positive and accurate stop, which stop is free from wear.

Another object of the invention is to provide a lathe embodying tool supports actuated by means of cams, which cams are arranged to be oscillated so as to permit the stroke of the tool support to be varied, for example, by using various portions of the cam.

Another object of the invention is to provide an automatic lathe embodying an improved feeding mechanism for the front carriage and cross slide driven from a single feed shaft and arranged to permit an inward movement of the cross slide prior to any movement of the carriage and then a feeding movement of the carriage during a dwell in the cross slide movement.

Another object is to provide in an automatic lathe, a feeding mechanism for a tool support embodying a cam mechanism embodying a pair of counterpositioned coextensive cams operating successively to move the tool support continuously.

A further object of the invention is to provide an automatic lathe with a single set of cams, together with operating mechanism therefor, which devices are adapted to perform any work within the range of the machine and yet operate at high efficiency and without idle or unnecessary movements of the tools.

In pursuance of the foregoing objects, the present embodiment of the invention consists of an automatic lathe embodying a longitudinally movable front carriage having a cross slide thereon and a longitudinally adjustable rear carriage also having a cross slide thereon, together with cam mechanisms for moving said front carriage and cross slides, and means for actuating said cams comprising a feeding mechanism connected to the lathe spindle and a reversing traverse mechanism connected directly to the main drive shaft and including an automatic control arranged to provide a cycle comprising a rapid movement of the tools into engagement with the work, a feeding movement of the tools during the cutting operation, and a rapid movement of the tools back to their initial position.

Further objects and advantages of the invention will become apparent as the description proceeds.

In the drawings,

Fig. 2 is a plan view thereof.

Fig. 3 is a fragmentary vertical section through the headstock and main drive shaft, taken along the line 3—3 of Fig. 2.

Fig. 4 is a vertical section through the spindle and feed box taken along the line 4—4 of Fig. 5.

Figure 1:
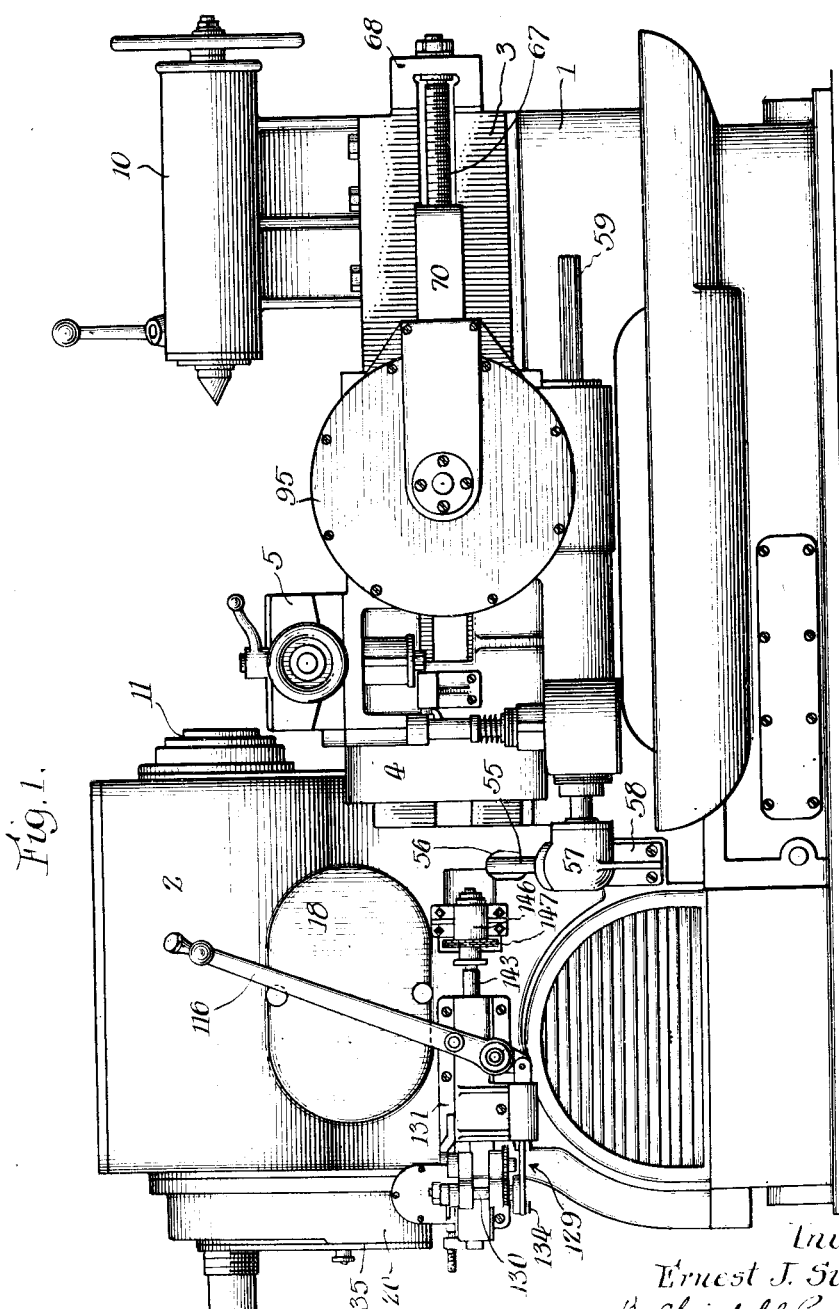
Figure 1 is a front elevation of a preferred form of the invention.

Fig. 4ª is a detail of a portion of mechanism shown in Fig. 4.

Fig. 5 is an end view of the headstock and feed box, partly in section along the line 5—5 of Fig. 4.

Fig. 6 is a plan section along the line 6—6 of Fig. 4 and including a portion of the feeding mechanism to the front carriage and cross slides.

Fig. 7 is a section through the feeding mechanism for the front carriage and cross slide.

Figs. 8 to 11 are details of portions of the clutch device for the front cross slide.

Fig. 12 is a section along the line 12—12 of Fig. 7.

Figs. 13 to 16 are diagrammatic views on a reduced scale showing various positions of the front carriage feed cam during a longitudinal movement of the carriage.

Fig. 17 is a transverse section substantially along the line 17—17 of Fig. 7 through the front cross slide and carriage.

Fig. 17a is a view of the front cross slide cam.

Fig. 18 is a transverse section through the rear carriage and cross slide.

Fig. 18a is a view of the rear cross slide cam.

Fig. 19 is a plan view of the automatic control for the feeding mechanism.

Fig. 20 is a front elevation of the mechanism shown in Fig. 19, partly in section along the line 20—20 of Fig. 19.

Fig. 21 is a section along the line 21—21 of Fig. 20.

Fig. 22 is a section along the line 22—22 of Fig. 20.

Fig. 23 is a sectional detail of a control handle shown in Fig. 20.

Figs. 24–28 are diagrammatic views of the automatic control devices in different positions.

While I have shown in the drawings and will herein describe in detail the preferred embodiment of my invention, it is to be understood that I do not thereby intend to limit the invention to the specific form disclosed, but aim to cover all modifications and alternative constructions falling within the spirit and scope of the invention as expressed in the appended claims.

As illustrated in the drawings, the invention comprises generally a bed 1 having a headstock 2 preferably formed integrally therewith. The bed is provided with longitudinal ways 3 along the forward face thereof upon which a front carriage 4 is movably mounted. This carriage has a cross slide 5 mounted thereon for movement transversely of the lathe. The bed is also provided with a pair of ways 6 (Figs. 2 and 18) along the rear upper surface thereof upon which a rear carriage 7 is adjustably mounted. This carriage supports a rear tool or cross slide 8. Intermediate the ways for the front and rear carriage is positioned a set of ways 9 upon which a tailstock 10 may be adjustably supported.

A work spindle 11 is rotatably supported in longitudinally spaced bearings in the headstock 2 and is arranged to be driven from a main drive shaft 12 (Fig. 3) which extends transversely of the lathe by means including a pair of pick-off gears 13, 14, a shaft 15 and worm and worm wheel 16 and 17. The main drive shaft is arranged to be driven by means of a pulley 12b which is rotatably mounted on the shaft and adapted to be connected thereto by means of a clutch 12a having a shiftable actuator 12c. The shaft 15 is rotatably mounted in the headstock parallel to the main drive shaft, the pick-off gears being splined onto the forward ends of the shafts 12 and 15 and being enclosed by a detachable cover 18.

*Feed mechanism*

The feeding mechanism for the front carriage and the cross slides includes a common feed shaft 19 (Figs. 4, 5 and 6) extending centrally and longitudinally of the lathe bed, and means for driving said shaft at feed and traverse rates. As illustrated herein, the feed traverse mechanism for the shaft 19 is contained in a feed box 20 mounted on the headstock 2 and comprises a feed gear train driven from the spindle 11 (Fig. 4) and a traverse drive driven directly from the main drive pulley 12b (Figs. 3 and 6). Referring particularly to Figs. 4 and 5, the feed gear train comprises a gear 22 secured to the spindle, a gear 23 mounted on a short shaft 24 which is journaled in the feed box parallel to the spindle, pick-off gears 25 and 26 mounted one on the shaft 24 and the other on a parallel shaft 27, and a pinion 28 on the rear end of the shaft 27, which pinion meshes with gear teeth 29 formed on the periphery of one-half 30 of the feed clutch. The other member 31 of the feed clutch is splined directly on the shaft 19 by means of a plurality of splines 32 and is arranged to be actuated into and out of engagement with the member 30 by means of a fork 33 mounted on a longitudinally movable rod 34. A spring 34a normally urges the feed clutch member 31 into engagement with the part 30. A detachable cover 35 is provided on the casing 20 for enclosing the pick-off gears 25, 26 to permit substitution thereof.

The traverse drive from the main pulley 12b to the common feed shaft 19 comprises (Figs. 3 to 6), a sprocket 36 mounted on the main pulley, a chain 37 connecting said sprocket and a sprocket 38 mounted on one end of a shaft 39 which extends transversely in the feed box 20 and parallel to the drive shaft 12, a reversing clutch mechanism comprising opposed beveled gears 40 and 41 rotatably mounted on the shaft 39 and an intermediate bevel gear 42 which is keyed to the front end of the feed shaft 19. A shiftable double faced clutch member 43 is positioned intermediate opposing clutch faces 44 (rapid approach) and 45 (rapid return) mounted on the bevel gears 40, 41 and is splined to the shaft 39 so that upon engagement of the shiftable member 43 with one or the other of the clutch members 44 and 45 the feed shaft 19 is driven in reverse directions at traverse speeds. The clutch members 44, 45 which are secured to the bevel gears are preferably of a friction disk type so as to prevent undue shock to the tool supports and feeding mechanism when the traverse clutch is shifted.

The shiftable feed clutch member 31 (Fig. 4) and the traverse clutch member 43 (Fig. 5) are preferably interlocked to prevent simultaneous engagement. An exemplary form of interlock is shown comprising a projecting cam member 46 which is pinned to a clutch shifting yoke 48 for the traverse clutch, which yoke is mounted on a control rod 47, and a pair of spaced rollers 49 carried on the forward end of the feed clutch rod 34 as shown most clearly in Figs. 4 and 4ᵃ.

Movement of the traverse clutch rod 47 causes the cam 46 to engage either of the rollers 49 and shift the rod 34 to disengage the feed clutch, the cam 46 and rollers serving also as a detent device for both clutches. The means for operating the control rod 47 will be described hereinafter.

*Front carriage mechanism.*

As mentioned hereinbefore, the front carriage 4 and the cross slides 5 and 8 are arranged to be driven from the common feed shaft 19. The mechanism for driving the front carriage (Figs. 1, 6, 7 and 17) comprises a beveled gear 50 (Fig. 6) rotatably mounted in a housing 51 which is bolted to brackets 52 formed integrally with the bed 1. Preferably, a reduced portion of the shaft 19 enters the bore of the gear, a driving connection between the shaft and gear being provided by a plurality of end keys 50ᵃ. The housing 51 also provides a support for bevel gears 53 and 54, the gear 53 being similarly keyed on one end of a shaft 55 which extends forwardly and downwardly from the housing 51 and through an aperture 56 in the forward wall of the bed. The forward end of the shaft 55 extends into a housing 57 which is mounted on the bed by means of a bracket 58 (Fig. 1). Also extending into this housing 57 is a splined shaft 59 positioned longitudinally of the bed, bevel gears (not shown) being mounted in the housing 57 for connecting the shafts 55 and 59.

The shaft 59 is also housed by a portion of the front carriage 4 and is arranged to drive the carriage feeding mechanism and also the front cross slide feeding mechanism.

The carriage feeding mechanism includes a rotatably mounted member arranged, during a partial rotation thereof, to cause no movement of the carriage and thereafter, upon further rotation thereof, to move the carriage longitudinally of the bed. As illustrated herein, Figs. 7, 12 and 17, this mechanism comprises a worm 60 and worm wheel 61 journaled on the carriage to travel with the latter, the worm being splined to the shaft 59 so as to be driven thereby.

The worm wheel 61 is also a cam disk which has cam slots 62, 63 formed on the front and rear sides thereof. These cam slots are counter or reversely positioned and coextensive or of equal displacement and are engaged by a pair of spaced rollers 64, 65 which are rotatably mounted on a member 66 on the bed 1, which member is adjustable on the bed longitudinally of the ways 3 by means of a screw 67. This screw (Figs. 1, 12 and 17) is rotatably mounted at one end in a bracket 68 extending from the bed 1 and engages a nut 69 mounted on the slide 66. As shown most clearly in Fig. 12, the roller 64 is disposed 180° from the roller 65 and is mounted on a forwardly extending L-shaped portion 70 of the slide.

In its exemplary form the cam slot 62 (Fig. 7) has a 90° circular or dwell portion 62ᵃ adjacent the center of the disk and an actuating portion 62ᵇ leading to the periphery of the wheel. The cam slot 63 has a dwell portion 63ᵃ adjacent the periphery. The slot 63 then has a 180° actuating portion 63ᵇ leading from the periphery of the disk to the center, and a second dwell portion 63ᶜ adjacent the center. The operation of this cam mechanism for feeding the carriage will be hereinafter more fully described with the operation of the machine.

*Front cross slide mechanism*

As mentioned hereinbefore the cross slide 5 is arranged to be driven from the splined shaft 59. In the preferred form of the invention the drive from this shaft to the cross slide comprises (Fig. 7) a bevel gear 71 rotatably mounted on the carriage in splined relation to the shaft 59 and a bevel gear 72 meshing with the gear 71 and rotatably mounted in the carriage and keyed to a vertical shaft 73. A clutch device comprising members 74 and 75 is arranged to connect and disconnect the shaft 73 to and from a shaft 76 which is rotatably mounted in the carriage coaxially with the shaft 73. The upper end of the shaft 76 carries a pinion 77 which meshes with a gear 78 mounted on the upper end of a stub shaft 79 also rotatably supported on the carriage.

This gear 78 (Figs. 7, 17 and 17ᵃ) is provided with a cam slot 80 upon its upper face, a roller 81 being arranged to engage in said slot. This roller is preferably mounted on an adjusting bar 82 to which the cross slide may be secured by means of a clamping device 83 so as to permit the cross slide to be adjusted to the desired initial position by means of a customary adjusting screw device 84.

As mentioned hereinbefore the invention contemplates movements of the carriage 4 and cross slide 5 independently of each other even though said members are driven from the common shaft 59. Thus the cross slide 5 may be actuated while rollers on the slide 66 engage dwell portions of the cams 62, 63; and the carriage 4 may be moved while the clutch members 74, 75 are disengaged. The lower clutch member 74 is preferably of the form shown in Figs. 8 and 10, having a single segmental tooth 85 with a radially projecting cam portion 86. The segmental tooth 85 is arranged normally to engage one end abutment 87ᵃ of a segmental slot 87 (Fig. 9) formed in the upper clutch member 75, the lower clutch member 74 being urged upwardly into engagement with the member 75 by means of a spring 88 (Fig. 7). Thus the cross slide cam 80 is normally actuated simultaneously with the cams 62, 63 but it is arranged to be automatically disconnected when the cross slide has reached its innermost position by means comprising a dog or roller 89 secured to one end of a reciprocating plunger 90 which is slidably mounted in a bracket 91 on the carriage. The plunger 90 is arranged to be actuated to move the roller 89 into and out of the path of the cam portion 86 of the lower clutch member. The plunger is preferably reciprocated automatically by means of a pin 92 secured thereto and engaging in a cam slot 93 on the lower face of a disk 94 (Figs. 7 and 11) which disk is bolted to the lower end of the stub shaft 79. Thus when the roller 89 is moved into the path of the cam portion 86 during the inward movement of the cross slide, the roller at each revolution of the clutch member 74, depresses said member to prevent engagement of the tooth 85 with the abutment 87ᵃ, but upon reverse rotation the tooth 85 drops into the slot 87 and engages the abutment 87ᵇ to withdraw the cross slide. The cam slot 93 is of such form that a partial reverse rotation of the clutch member 75 is sufficient to move the roller out of the path of the cam portion 86 and thereby permit a complete withdrawal of the cross slide.

As illustrated in the drawings the carriage cams are preferably enclosed as by means of a cover 95 suitably secured to the carriage, which cover as shown in Fig. 17 serves also to support the worm wheel 61.

Rear cross slide mechanism

The rear cross slide is also arranged to be driven from the main shaft 19 (Fig. 6). As illustrated herein the drive mechanism comprises a shaft 96 keyed at one end to the bevel gear 54. This shaft extends rearwardly of the lathe and into the housing 97 which contains a stroke mechanism for the rear cross slide. The rear end of the shaft 96 is rotatably mounted in said housing and carries a bevel gear 98 which meshes with a bevel gear 99 mounted on a stub shaft 100. This shaft is rotatably supported in the housing transversely of the shaft 99 and longitudinally of the lathe. One end of the shaft is provided with a plurality of integral keys and arranged to receive a pick-off gear 101 which meshes with a second pick-off gear 102 similarly keyed to a parallel shaft 103, the pick-off gears being held on the shafts by means of a cover 104. The shaft 103 extends longitudinally of the bed and has a splined portion extending through the rear carriage 7 (Figs. 2 and 18).

The rear cross slide is also preferably actuated by means of a face cam. As illustrated herein a worm 105 (Fig. 18) is rotatably mounted in the rear carriage 7 in splined relation with the shaft 103 and meshes with a worm wheel 106 which is mounted on a downwardly extending collar portion 107 of a cam disk 108. This cam disk is also provided with a downwardly extending pivot pin 109 which is rotatably supported on the carriage, and has a cam slot 110 in its upper face in which a roller 111 engages. This roller is also rotatably mounted on an adjusting bar 112 which is adjustable transversely of the carriage and to which the cross slide 8 may be secured by means of a clamping device 113. The cross slide may be adjusted relatively to the bar 112 as by means of a screw 114 secured to the bar and a manually operable nut 115 rotatably mounted on the slide.

Control

The invention contemplates a manual engagement of the main clutch 12ᵃ by the actuator 12ᶜ for commencing an operation, the engagement of this clutch being arranged to rotate the spindle 11 and a simultaneous engagement of the traverse clutch 43 to cause a rapid approach of the cutting tools to the work. Upon the completion of the rapid approach movement there is an automatic shift to the feeding movement of the tools after which the feeding mechanism and the spindle drive mechanism are tripped out by disengagement of the main clutch and the feed clutch, and a rapid return movement of the tools is obtained through the traverse drive to the tool supports. This drive, as described hereinbefore obtains its power directly from the sprocket 36 on the main drive pulley. Thus it will be apparent that while the machine is being set up the tool supports may be driven at a traverse rate while the spindle and feed mechanisms are disengaged.

Means for manually controlling the main clutch is herein illustrated as comprising a hand lever 116 mounted on the forward end of a rock shaft 117 which extends through the bed of the machine transversely thereof. The rear end of said shaft carries a bevel gear 118 (Fig. 3) which meshes with a second bevel gear 119 mounted on the lower end of a vertical shaft 120. This shaft is provided with a pinion 121 which engages a rack 122 on a sliding bar 123, the bar 123 carrying a yoke member 124 arranged to actuate the clutch member 12ᶜ. A spring 123ᵃ is preferably provided to assist in the disengagement of the clutch. In Fig. 1 the lever 116 is shown in its normal or inoperative position, the lever being arranged to be moved toward the left to a position an equal distance beyond the vertical to engage the main clutch.

The main clutch 12ª is preferably disengaged at the end of the feeding movement of the tools by means including an arm 125 on the vertical shaft 120 and a link 126 (Fig. 2) which connects the free end of said arm with a longitudinally reciprocating rod 127. This rod extends through the rear carriage 7, and is preferably actuated at the end of a feed movement by means of a suitable dog 128 secured to the periphery of the disk 108.

The control handle 116 when moved from its inoperative or normal position to its operative position is arranged also to cause engagement of the rapid approach clutch 43, 44 by moving the clutch rod 47 to engage the traverse clutch member 43 with the rapid approach clutch member 44. The mechanism for accomplishing this is disclosed herein as comprising (Figs. 19-22) an automatic trip dog actuated control device for the traverse clutch rod 47 and a linkage generally designated as 129 connecting the hand lever 116 with said device. The automatic device comprises a vertical trip member 130 rotatably mounted on a bracket 131 which is secured to the forward side of the bed 1 at the headstock end (see Fig. 1). This trip member is provided with an eccentrically mounted pin 132 at its upper end, which pin is connected to the control rod 47 by means of a link 133. At its lower end the trip member 130 is provided with a second eccentrically mounted pin 134, to which one end of the linkage 129 is connected.

The trip member 130 is provided with a pinion 135 adjacent its lower end which pinion meshes with a gear 136 secured to the lower end of an adjacent vertically positioned rotatable trip element 137. Preferably the pinion 135 is one-half the diameter of the gear 136 so that during one revolution of the element 137 the member 130 makes two revolutions.

The trip element 137 is provided with a pair of diametrically opposite abutments or contact surfaces 138 and a second pair of diametrically opposite abutments or rollers 139 on the upper end thereof, and is adapted to be actuated during the traverse and feed movements of the tool supports for the purpose of shifting automatically the control rod 47 and thereby the traverse and feed clutches. As illustrated herein, dogs 140 and 141 are provided for actuating the trip device, said dogs being adjustably mounted on a slide 142 which is supported on the front face of the bed 1 for movement longitudinally thereof. The dog 140 is arranged to engage the contact surfaces 138 and the dog 141 is shown positioned in a higher plane and arranged to engage the rollers. The slide is arranged to be actuated by means of a screw 143 which engages a nut 144 on the slide, the screw being rotatably mounted on the bed and being driven by means of a chain 147 (Fig. 6) which connects a sprocket 148 on the feed shaft 19 with a sprocket 149 normally rotating with the screw 143. For purposes of set-up or adjustment the sprocket 149 is rotatably mounted in a bracket 146 secured to the bed of the lathe and is connected to the screw by means of a suitable spring pressed plunger device 150 which is carried on the screw and adapted to engage an aperture 151 in a sleeve portion 152 of the sprocket 149. It will be apparent that the slide 142 will move simultaneously with the feed shaft 19 and at a definite speed ratio thereto.

The linkage 129 includes a link 129ª pivoted at one end to the pin 134 and at the other end to a plunger 129ᵇ which is slidably mounted in the bracket 131 (Fig. 20). The plunger carries a pin 129ᶜ which enters an elongated slot 129ᵈ in the link 129ª so as to permit a certain amount of lost motion therebetween. The other end of the plunger is pivotally connected to an arm 153 which projects radially from a collar 154 (Figs. 3, 20 and 22) rotatably mounted on a cylindrical hub portion 116ª of the hand lever 116. The arm is normally arranged to move with the lever, the collar being provided with a suitable transverse groove on its upper surface engageable by a plunger 155 mounted on the lever 116. This plunger may be actuated by means of a finger lever 156 pivotally mounted adjacent the handle portion 157 of the lever 116 and connected to the plunger by means of a rod 158. A detent device 159 is arranged to engage either of the two V-grooves 160 in the plunger to lock the plunger in its engaged or disengaged position.

By actuating the finger lever 156 to withdraw the plunger 155, the main clutch 12ª may be actuated by means of the hand lever 116 without operating the feed and traverse clutches. Usually a suitable device (not shown) is provided for mechanically disengaging the feed clutch 31 when setting up the machine so that the lever 116 may be used merely to control operation of the spindle. With the linkage so disconnected from the lever 116 i. e., by disengagement of the plunger 155 from the collar 154, the control rod 47 may be actuated by means such as a handle 161 (Figs. 20 and 23). This handle has an aperture end 162 surrounding the trip element 137 and is provided with a plunger 163 engageable with any one of a plurality of vertical slots 164 in the trip element. This plunger is normally urged into a slot by means of a spring 165 but may be disconnected therefrom by rotation of the free end member 166 of the handle. This member is preferably pinned to the plunger and provided with a cam surface 167 arranged, upon rotation of the end member, to move the plunger longitudinally of the handle.

*Operation*

The front carriage 4 is driven from the feed shaft 19 (Figs. 1, 6 and 7) through the gearing in the housing 51, shaft 55 and the bevel gears in the housing 57, the shaft 59, the worm and worm wheel 60, 61, the cam slots 62, 63 and the rollers 64, 65. Figs. 13 to 16 illustrate four positions of the worm wheel 61 during a movement of the front carriage through its maximum stroke. In Fig. 13 the front roller 64 (Fig. 12) is in engagement with the dwell portion 62ª of the front cam slot 62 and during a 90° revolution of the worm wheel to a position such as is shown in Fig. 14, rotation of the worm wheel causes no movement of the carriage. It is during this period that the cross slide 5 is generally moved inwardly by means of the cam slot 80 and roller 81 (Figs. 7, 17 and 17ª), the gear 78 being driven from the shaft 59 through the intervening connections including the clutch device 74, 75. The operation of the clutch trip dog 89 (Fig. 7) is so timed by means of the cam slot 93 in the disk 94 that upon completion of the inward movement of the cross slide, the clutch device 74, 75 is disengaged. Thus, upon further rotation of the worm wheel 61 through 180° to the position shown in Fig. 15, the front carriage is fed longitudinally as the roller 64 engages the actuating portion 62ᵇ of that cam slot. This movement of the worm wheel places the roller 64 in a position where it will, upon further rotation of the worm wheel, be disengaged from the cam slot while the rear roller 65 engages in the counter positioned cam slot 63. Upon an additional 180° movement of the worm wheel to a position such as shown in Fig. 16, the roller 65 engages the actuating portion 63ᵇ of the rear cam slot to move the carriage longitudinally another one-half stroke. During this movement of the worm wheel the roller 64 is out of engagement with the front cam slot.

It will be apparent that with the mechanism disclosed the carriage can be moved longitudinally through a stroke twice as great as would be obtainable with a single cam slot on a disk of the same diameter. If it is desired to operate at a shorter stroke, i. e., between one-half and full stroke, the carriage is initially set so that instead of beginning the operation at the point shown in Fig. 13, the roller 64 may be initially set somewhere on the actuating portion 62ᵇ of the front cam slot. Similarly if less than one-half stroke is required, the carriage may be initially set with the roller 65 at an intermediate point on the actuating portion 63ᵇ of the rear cam slot, such adjustment being permitted by the longitudinal adjusting screw 67 for the roller supporting slide 66.

Upon completion of the carriage movement a reversal of the shaft 59 causes a return of the carriage. Simultaneously, reverse movement of the clutch member 74 causes an engagement of the tooth 85 with the reverse abutment 87ᵇ on the clutch member 75 and returns the cross slide to its initial position.

The rear cross slide is operated by means of the cam 110 and roller 111 (Fig. 18) which cam is driven (Fig. 6) from the feed shaft 19 through bevel gears 50, 54, shaft 96, bevel gears 98, 99, shaft 100, pick-off gears 101, 102, shaft 103, (Fig. 18) worm 105 and worm wheel 106. The movement of this slide may be adjusted by means of the pick-off gears 101, 102, the length of stroke being determined by the initial position of the roller 111 on the cam 110 (Fig. 18ª) and the set-up being accomplished while a pick-off gear is removed. Thus, so far as movement of the rear cross slide is concerned, the pick-off gears are altered for the purpose of changing the length of stroke of the slide inasmuch as the rear carriage is driven directly from the feed shaft 19 and by increasing or decreasing the number of rotations of the shaft 103, the angular movement of the cam 110 is increased or decreased.

In its preferred embodiment the invention contemplates a movement of the tool slides comprising first, a rapid approach of the tools to the work, second, a feeding movement of the tools, and third, a rapid return of the tools to their initial position. Mechanism is provided so that to start the machine, a manual operation of the hand lever 116 engages the main clutch 12ª and shifts the rapid traverse clutch 43 into its rapid approach position, thus causing a rotation of the spindle 11 and a rapid movement of the feed shaft 19, and thereby a rapid movement of the tools toward the work. Upon completion of the rapid approach movement of the tools, the automatic trip mechanism (through dog 140) causes a shift of the clutch control rod 47 to a neutral position of the traverse clutch 43, thus permitting an engagement of the feed clutch 31 and causing the tools to be moved slowly for the cutting operation. Upon the completion of the cut the control rod 127, which is actuated from the rear cross slide cam disk 108 by the dog 128 when the rear tool has finished its operation, disengages the main clutch 12ª and causes a shift of the control rod 47 to move the traverse clutch 43 into its rapid return position. The spindle, because of the disengagement of the main clutch at the end of the feed movement, is, therefore, at rest during the return movement of the tools, the traverse clutch being again shifted to neutral at the end of the return stroke by the dog 141 of the automatic trip device, and since the spindle is already at rest, the engagement of the feed clutch 31 when the traverse clutch is moved to neutral does not cause a movement of the tools.

In an exemplary set-up of the preferred form of the invention, the normal positions of the control lever and trip devices are as shown in the drawings. Thus with the lever 116 to the right as in Fig. 1, the main clutch 12ª is disengaged and with the trip element 137 positioned as in the drawings (most clearly shown in Figs. 6 and 24) the control rod 47 and, therefore, the traverse clutch 43, are in neutral. The feed clutch 31 is, therefore, engaged but inasmuch as the spindle is not rotating there is no movement of the tool supports.

Movement of the control lever 116 (manually to the left from its normal position causes an engagement of the main clutch 12ª through the intervening connections, shaft 117, bevel gears 118, 119, shaft 120, pinion and rack 121, 122, bar 123 and yoke 124. This movement of the lever also shifts the trip element 137 and the control rod 47 from the neutral position shown in Fig. 24 to the rapid approach position shown in Fig. 25 by means of the linkage 129.

The trip dog 140 is so positioned on the slide 142, as by means of an adjusting screw 140ª (Fig. 19), that upon the completion of the rapid approach movement of the tool supports, this dog strikes one of the abutments 138 of the trip element 137 and shifts the trip element and thereby the control rod 47 from the positions in Fig. 25 into the positions shown in Fig. 26. Thus the control rod 47 has moved the traverse clutch 43 into neutral and has permitted the feed clutch 31 to be engaged automatically. The lost motion connection between the link 129ª and plunger 129ᵇ of the linkage 129 (Fig. 20) which lost motion is obtained by means of the pin and slot connection 129ᶜ, 129ᵈ, is provided to permit the movement of the trip member 130 from the rapid approach position shown in Fig. 25 to the feed position shown in Fig. 26 without actuating the main control lever 116. During this shift of the trip element the pin 134, to which the other end of the link 129ᵉ is connected, has but a slight movement longitudinally of the link.

The feed movement of the tool supports continues until the rear tool has finished its stroke whereupon a dog 128 (Fig. 2) trips the main clutch 12ª through the rod 127, link 126, arm 125, pinion 121 and rack 122 (Figs. 2 and 3) and shifts the lever 116 back to the right (Fig. 1). The spindle and also the feed clutch 30 are thereby stopped, the traverse drive to the shaft 39 (Figs. 3 and 6) continuing to operate through sprockets 36 and 38 and chain 37. The movement of the hand lever 116 from its operative to its inoperative position during the automatic disengagement of the main clutch 12ª shifts the trip device 137 from the position shown in Fig. 26 to that shown in Fig. 27, the trip device being actuated through the linkage 129. This movement of the trip device moves the control rod 47 and clutch 43 into the rapid return position and causes a rapid return movement of the front carriage and both cross slides. The dog 141 is positioned on the slide 142 so that upon the completion of the return movement of the tool support this dog strikes one of the rollers 139 on the trip element and moves the trip element and the control rod 47 from the positions shown in Fig. 27 into their neutral positions as shown in Fig. 28, whereupon the return movement of the carriages stops. The machine is then in readiness to repeat the operation.

It will be apparent from the foregoing that the invention provides a machine completely automatic in character but so constructed that it may be readily set up for different operations. Should the strokes of the tool be less than the maximum allowable the operating time may correspondingly be decreased, there being no idle movement of the cams or carriages such as is ordinarily found in single purpose automatic machines.

By providing the cam slots 80 and 110 for the front and rear cross slides with peripheral dwell portions and using accurately mounted rollers such as disclosed, for engagement with these cams, the parts are free from wear and permit of an accurate stop of the feeding movement of the slides. Thus the slides may be fed in to precision depths. In addition to this the novel construction of the cam mechanism for the front carriage permits of an adequate stroke with the use of a cam of a size less than that ordinarily provided.

The unitary feed drive to the carriage and cross slides permits of a simplified construction and this, together with the simplified trip mechanism permissible with such a drive, provides a control for the lathe which is simple and rugged in construction and effective in operation.

It will also be apparent that with the construction shown for the front carriage and front cross slide considerable time in operation is saved by returning the carriage and front slide simultaneously to their initial position, thus obtaining in effect a triangular movement of the tool carried by the front cross slide.

I claim as my invention:

1. In a machine tool, the combination of a spindle, a main drive shaft, a pulley thereon, a main clutch for connecting said pulley to said drive shaft, a feed shaft, means for actuating said feed shaft in opposite directions at traverse rates driven from said main pulley and including a reversing traverse clutch, means for actuating said feed shaft at feed rates driven from said spindle and including a feed clutch, means for engaging said main drive clutch arranged simultaneously to engage said traverse clutch, and means moving continuously in accordance with said feed shaft arranged to disengage said traverse clutch and engage said feed clutch.

2. In combination, in a machine tool, a tool slide, a frame having ways along which the tool slide is capable of being moved, and mechanism for operating said tool slide at feed and traverse rates, said mechanism including a feed shaft, a traverse drive shaft positioned transversely at one end thereof, a reversing traverse clutch including a member reciprocating longitudinally of said traverse shaft, a feed clutch including a member reciprocating longitudinally of said feed shaft, and means for engaging said feed clutch when the traverse clutch is in non-engaging position.

3. In a machine tool, the combination of a spindle, a main drive shaft, a pulley rotatably mounted thereon, means for connecting said pulley to said shaft, means for driving said spindle from the main drive shaft, a feed shaft, traverse means for reversibly rotating said feed shaft driven from said pulley, means for rotating said feed shaft driven from said spindle, a control device for reversing the direction of said traverse drive, and means operable by said control device to disengage the feed drive when the control device is operated to engage the traverse drive.

4. In a machine tool, the combination of a spindle, a main drive shaft, a pulley thereon, a main clutch for connecting said pulley to said drive shaft, a feed shaft, means for actuating said feed shaft in opposite directions at traverse rates driven from said main pulley and including a reversing traverse clutch, means for actuating said feed shaft at feed rates driven from said spindle and including a feed clutch, and means for engaging said main drive clutch arranged simultaneously to engage said traverse clutch.

5. In combination, in a machine tool, a tool slide, a frame having ways on which the tool slide is mounted, feed and traverse drive mechanisms for actuating said tool slide including a common feed shaft, a reversible clutch device for the traverse transmission, a feed clutch, a control rod for actuating said traverse clutch, and a rod operable to disengage said feed clutch when the traverse clutch is in an engaged position.

6. A machine tool having, in combination, a tool holder, a feed shaft for moving the tool holder, a spindle for rotating the work, a main drive shaft, a driving pulley loosely mounted on said drive shaft, a main clutch device between said pulley and drive shaft, actuating connections between the drive shaft and spindle for rotating the spindle, driving connections between the spindle and the feed shaft including a feed clutch device, driving connections between the pulley and the feed shaft including a traverse clutch device, and means including a manually operable handle to engage said main and traverse clutch devices simultaneously.

7. A machine tool having, in combination, a tool support, a feed shaft for moving the tool support, a spindle for rotating the work, a main drive shaft, a driving pulley loosely mounted on said drive shaft, a main clutch device between said pulley and the drive shaft, actuating connections between the drive shaft and spindle for rotating the spindle, a traverse driving connection between the pulley and the feed shaft including a reversing clutch device, a feed driving connection between the spindle and the feed shaft including the feed clutch and arranged to be unaffected by said reversing clutch device, and means automatically operable while said main clutch is engaged to disengage said reversing clutch and engage said feed clutch.

8. A machine tool having, in combination a tool support, a feed shaft for moving the tool support, a spindle for rotating the work, a main drive shaft, a driving pulley loosely mounted on said drive shaft, a main clutch device between said pulley and drive shaft, actuating connections between the drive shaft and spindle for rotating the spindle, driving connections between the spindle and the feed shaft including a feed clutch device, driving connections between the pulley and the feed shaft including a traverse clutch device, and means automatically operable upon the completion of a feeding movement of the tool to disconnect said main clutch device and engage said traverse clutch device.

9. A machine tool having, in combination, a tool support, a feed shaft for moving the tool support, a spindle for rotating the work, a driving pulley, driving connections between the pulley and spindle including a main clutch, driving connections between the spindle and the feed shaft including a feed clutch, driving connections between the pulley and the feed shaft including a traverse clutch, and a manually operable lever arranged to operate said clutches.

10. In a machine tool, the combination of a prime mover, a spindle, means for rotating the spindle from the prime mover, a feed shaft, means for rotating the feed shaft independently of the spindle and at higher speed than by the spindle, including a reversing clutch, means unaffected by said reversing clutch for rotating the feed shaft from the spindle and including a normally engaged feed clutch, mechanism for actuating said reversing clutch comprising a reciprocable rod, and means moving with said rod for disengaging the feed clutch.

11. In combination in a machine tool, a tool support, a frame having ways along which the tool support is capable of being moved, a feed-traverse transmission mechanism for actuating said tool support including a common feed shaft, feed and traverse clutch devices for controlling the operation of said mechanism, a rod for disengaging one clutch device, a longitudinally reciprocating member for actuating the other clutch device and a device on said member for actuating said rod.

12. A machine tool having a feed shaft for moving the tool holder, a spindle for rotating the work, a main drive shaft, a driving pulley loosely mounted on said drive shaft, a main clutch device between said pulley and drive shaft, actuating connections between the drive shaft and spindle for rotating the spindle, driving connections between the spindle and the feed shaft including a feed clutch device, driving connections between the loose pulley and the feed shaft including a traverse clutch device, and a manual control lever arranged to actuate said main clutch and said traverse clutch.

13. A machine tool having a feed shaft for moving a tool holder, a spindle for rotating the work, driving means for the spindle, driving means connecting the spindle and the feed shaft including a feed clutch, other means for actuating the feed shaft connected to the spindle driving means and including a traverse clutch adapted to connect and disconnect the feed shaft from the driving means, a control device for operating said traverse clutch, and means movable by said control device for disengaging said feed clutch.

14. Machine tool mechanism, comprising a spindle, a drive pulley, a feed shaft, means for connecting said drive pulley directly with said feed shaft for rapid traversing including a reversing clutch, a feed change gear train connected to said feed shaft independently of said reversing clutch and including a feed clutch, and means associated with said clutches for disengaging the feed clutch when the reversing clutch is engaged.

15. In a machine tool, a bed having carriage ways, opposing spindles to rotatably support a work piece, a tool carriage mounted to move longitudinally upon said ways and carrying a reversible cam arranged to reciprocate the carriage, a cross slide mounted traversably upon said tool carriage and cam actuated to reciprocate thereon, a common reversible feed shaft for said carriage and cross slide cams, said tool carriage and cross slide serving conjointly to operate a tool in a cyclic movement.

16. A machine tool having, in combination, a bed, a carriage movable longitudinally thereof, a cross slide movable transversely thereof, a rotatably mounted spindle for the work, driving means for the spindle including a main clutch, driving means for the carriage and cross slide including a common feed shaft, means to drive said feed shaft at feed and traverse rates, and means operated by the carriage driving means for disengaging the main clutch.

17. A machine tool having, in combination, a longitudinally movable carriage, a transversely movable cross slide, a rotatably mounted spindle, means for driving the spindle including a main clutch, actuating mechanism for the carriage including a feed shaft, actuating mechanism for the cross slide driven from said feed shaft, means for actuating the feed shaft including feed and traverse clutches, and a control device actuated by the cross slide driving means for disengaging the main clutch.

18. A machine tool having, in combination, a carriage, a cross slide, means for actuating the carriage and cross slide including a common feed shaft, mechanism for actuating the feed shaft including feed and traverse clutches, a manually controlled device for engaging the traverse clutch, and means operable concurrently with the feed shaft arranged at a predetermined point of carriage feed to disengage the traverse clutch and engage the feed clutch.

19. A machine tool having, in combination, a front tool carriage, a rear tool cross slide, a spindle for the work, a main clutch for the spindle, actuating mechanism for the carriage, a cross slide including a feed shaft, means to drive the feed shaft including a traverse clutch, means timed with the rear cross slide for disengaging the main clutch, and means operated from said feed shaft for disengaging the traverse clutch.

20. A machine tool having front and rear cross slides and independent mechanism for operating the cross slides, said mechanism comprising rotatable cams, means for rotating the cams at feed speeds in one direction, means for rotating the cams at traverse speeds in opposite directions, and means including alterable change gears whereby the stroke of one cross slide may be changed.

21. A machine tool having, in combination, a carriage, a front cross slide mounted on said carriage, a rear cross slide, means to actuate said carriage and cross slides including a common feed shaft, means driven from said feed shaft to actuate the carriage and front cross slide and independent means driven from said feed shaft to actuate said rear cross slide, and means to actuate said feed shaft at a feed speed in one direction, and at a traverse speed in opposite directions.

22. In a lathe, the combination with a bed, a carriage mounted thereon, a reversible feed shaft, a worm splined to said feed shaft and journalled on said carriage, a cam journalled on the carriage and driven from said worm, and a cam follower secured adjustably to the bed whereby said carriage is fed longitudinally of the bed.

23. In a lathe, in combination, a bed, a carriage movably mounted thereon, a shaft rotatably mounted on said bed, a worm journalled on the carriage and splined to said shaft, a worm wheel journalled on the carriage engaging said worm and having cam slots on the opposite faces thereof and a pair of rollers mounted on the bed adapted to engage said cam slots successively.

24. In a lathe, in combination, a bed, a carriage movably mounted thereon and means for moving said carriage comprising a drive shaft rotatably mounted on the bed, a worm journalled on the carriage driven by said shaft, a worm wheel journalled on the carriage meshing with said worm and having cam slots on the opposite sides thereof, a slide bar adjustably mounted on said bed and a pair of rollers secured to said bar and adapted to engage said cam slots.

25. In a lathe, in combination, a bed, a carriage movably mounted thereon, and means for moving said carriage comprising a drive shaft rotatably mounted on the bed, a worm journalled on the carriage driven by said shaft, a worm wheel journalled on the carriage meshing with said worm and having cam slots on the opposite sides thereof, one of said cam slots having a dwell portion adjacent the center of the wheel and an accelerating portion extending through approximately 180° from said dwell portion to the periphery, the other slot having a dwell portion adjacent its periphery and an approximately 180° accelerating portion extending towards the center of the cam and means mounted on said bed arranged to engage said cam slots successively.

26. In a lathe, in combination, a bed, a carriage movably mounted thereon, a cam disk rotatably mounted on said carriage and having slots on the opposite faces thereof, a pair of followers mounted on the bed arranged to engage said cam slots successively during a movement of the support, and means to rotate said disk in opposite directions.

27. In a lathe, in combination, a bed, a tool support movably mounted thereon, a cam disk rotatably mounted on one of said members and having a pair of counter-positioned coextensive cam slots thereon, a pair of followers mounted on the other member arranged to engage said cam slots successively during a movement of the support, and means to rotate said disk in opposite directions.

28. In a lathe, in combination, a bed, a tool support movably mounted thereon, and a driving means for said support comprising a structure rotatably mounted on one of said members and having a pair of coextensive cams thereon, a pair of followers mounted on the other member arranged to engage said cams successively to cause a continuous movement of the tool support on the bed greater than the relative movement of one of the followers by one of the cams, and means to drive said cam structure.

29. In combination, in a lathe, a bed, a carriage movably mounted thereon, and carriage driving mechanism comprising a reversible cam disk mounted on the carriage, said cam disk having substantially 180° cam slots successively arranged on the opposite sides thereof and means on said bed arranged successively to engage said cam slots.

30. In a machine tool, the combination with a tool carriage, feed mechanism therefor, and a drive shaft for the feed mechanism, of a cross tool slide on the carriage and means operated by said drive shaft for feeding the tool slide, said means including a cam, a clutch device controlling the rotation of said cam and means for automatically disengaging said clutch device when the tool has been fed to a proper depth.

31. In a machine tool, in combination, a bed, a carriage movably mounted thereon, a cross slide on said carriage, a reversible drive shaft journalled on the bed extending along said carriage, means driven from said shaft to actuate the carriage including a cam disk journalled on the carriage and a follower mounted on the bed and means to actuate the cross slide comprising a disk mounted on the carriage having a cam slot therein, a roller engaging in said slot arranged to move with said slide and means to actuate said disk arranged to be connected to said drive shaft.

32. In a machine tool, in combination, a longitudinally movable carriage, a cross slide thereon, feeding mechanism for the carriage including a reversible shaft extending longitudinally of the lathe and means to actuate the cross slide comprising a face cam journalled on the carriage, means movable with the cross slide arranged to engage the cam slot, means connecting said cam with said shaft including a clutch device and a trip mechanism arranged to disengage said clutch device when the cross slide has been fed to a predetermined depth.

33. The combination with a tool carriage and a drive shaft therefor, of a cross tool slide on the carriage, means including a clutch device mounted on the carriage operated by rotative movement of the drive shaft in one direction for feeding the cross tool slide toward the work piece, and means driven from said shaft including a cam mounted on said carriage for moving the carriage in a feed movement transverse to that of the cross tool slide.

34. In a machine tool, the combination of a bed, a tool carriage movably mounted thereon, a drive shaft for said carriage, a cross tool slide on the carriage, and means operated by rotative movement of the drive shaft in one direction for feeding the cross tool slide toward the work-piece and the carriage in a feed movement transverse to that of the cross tool slide and by rotative movement in the opposite direction to retract the cross tool slide and the carriage simultaneously.

35. The combination of supporting ways, a carriage mounted upon and movable along said ways, a cross slide mounted upon the carriage, a splined shaft, and means including a first cam operated by the said shaft during rotation thereof to feed the cross slide toward the work piece, said means also including a clutch device arranged to be disengaged by a predetermined rotative movement of said cam, and a second cam operable during continued rotation thereof for feeding the carriage lengthwise on said ways.

36. The combination of a bed having supporting ways, a carriage mounted upon and movable along said ways, a cross tool slide mounted upon the carriage, a feed shaft, a cam journalled on the carriage operated by rotation of the feed shaft for feeding the cross tool slide in to a working position, and a second cam journalled on the carriage for feeding the carriage lengthwise on said ways with the cross tool slide in said working position.

37. In a machine tool, the combination of a bed having supporting ways, a carriage mounted upon and movable along said ways, a cross slide mounted upon the carriage, a feed mechanism for the carriage including a drive shaft journalled on the bed and a carriage and a face cam mounted on the carriage, and means including a face cam mounted on said carriage and actuated by rotation of said drive shaft and a roller on the cross slide for feeding the cross tool slide toward the work piece.

38. In combination, a bed, a tool carriage slidable thereon, a feed shaft, a cross tool slide on the carriage, a clutch member in driving connection with the feed shaft, a second clutch member normally in engagement with the first clutch member, a cam member in geared connection with said second clutch member and adapted for advancing and retracting the cross tool slide, and means operable with said cam for disconnecting said clutch member.

39. The combination with a tool carriage and a drive shaft therefor, of a cross tool slide on the carriage, a clutch member in driving connection with the drive shaft, a second clutch member engageable therewith, a cam member in geared connection with said second clutch member and adapted for advancing and retracting the cross tool slide, and means for automatically engaging and disengaging said clutch members whereby to control the feed and reverse movements of the cross tool slide.

40. In a machine tool, the combination with a bed, a carriage mounted thereon, a cross slide on the carriage, a reversible feed shaft, a worm splined to said feed shaft and journalled on said carriage, a cam journalled on the carriage and driven from said worm, a follower for the cam mounted on the bed, a second cam journaled on said carriage driven from said feed shaft and arranged to actuate the cross slide, whereby said cross slide may be fed transversely prior to the movement of the carriage longitudinally.

41. A machine tool having, in combination, a bed, a longitudinally movable carriage movable thereon, a cross slide on the carriage, a reversible feed shaft journaled on the bed, a pair of cams rotatably mounted on the carriage and arranged to be driven by said feed shaft, a follower for one cam movable with the cross slide, and a follower for the other cam mounted on the bed.

42. In combination, in a machine tool, a spindle, a tool support, a prime mover, a main clutch intermediate the prime mover and spindle, feed traverse driving mechanism for said tool support, a control member for said mechanism, a control lever for said main clutch arranged when moved to engage said clutch to actuate said control member, and means for actuating said control member independently of said lever.

43. In combination, in a machine tool, a bed, tool supports movably mounted on said bed, means to drive said supports at feed and traverse rates including a common feed shaft and mechanism intermediate said shaft and supports arranged to permit of intermittent movement of the supports during continuous rotation of said shaft, a control member for said feed-traverse means, an automatic trip device for said control member, and means for actuating said device comprising a movably mounted trip dog driven simultaneously with said feed shaft.

44. In combination, in a machine tool, a spindle, a tool support, a prime mover, a main clutch intermediate the prime mover and spindle, feed-traverse driving mechanism for said tool support, a control member for said mechanism, a control lever for said main clutch, and a lost motion connection between said control lever and control member whereby the control member may be moved without moving the control lever.

45. In combination, in a machine tool, a bed, tool supports movably mounted on said bed, means to drive said supports including a common feed shaft and a mechanism intermediate said shaft and supports arranged to permit of intermittent movement of the supports during continuous rotation of said shaft, a control member for said drive means, an automatic trip device for said control member, and means for actuating said trip device comprising a movably mounted member driven simultaneously with said feed shaft.

46. In a machine tool, the combination of a bed having supporting ways, a carriage mounted on and slidably along said ways, a cross slide mounted upon the carriage, a feeding mechanism including a shaft operable when rotated in opposite directions to move said carriage along said ways toward and from a work piece longitudinally thereof, and actuating mechanism for said cross slide operated by said shaft and arranged to impart a definitely determined transverse movement to said slide during the first portion of the rotative movement of said shaft in either direction and thereafter to be unaffected by rotation of said shaft until its direction of rotation is again reversed.

47. In a machine tool, in combination, a longitudinally movable carriage, a cross slide thereon, and feeding mechanism for said carriage and cross slide including a reversible shaft, said mechanism being arranged when said shaft is rotated in one direction to initiate advancing movements of said cross slide and carriage successively and upon reverse rotation of said shaft to initiate retractive movements of said cross slide and carriage substantially simultaneously.

48. A machine tool having, in combination, a longitudinally movable carriage, a transversely movable cross slide, a rotatably mounted spindle, means for driving the spindle including a main clutch, actuating mechanism for said carriage and cross slide including a feed shaft, means for actuating the feed shaft including a feed clutch and a reversing traverse clutch, and a control device operated by said actuating mechanism for disengaging said main clutch upon the completion of a feeding movement, said device being arranged substantially simultaneously to cause disengagement of said feed clutch and engagement of said traverse clutch to initiate rapid return movements of said carriage and cross slide.

49. A machine tool having, in combination, a tool support, actuating mechanism for said support, a control device for said mechanism operable to cause movement of said support through a cycle comprising a series of movements of predetermined direction, speed and extent, a control handle movable from a first position to a second position to initiate said cycle of movement, and means actuated by said mechanism operable to return said handle to its first position during said cycle, said handle being arranged to permit independent movement of said device so that said cycle may be completed after the handle has been returned to said first position.

50. In a machine tool, a bed having carriage ways, a carriage mounted to move longitudinally upon said ways and carrying a reversible cam arranged to reciprocate the carriage, a cross slide mounted traversably upon said carriage and cam-actuated to reciprocate thereon, and a common reversible feed shaft for said carriage cam and cross slide cam.

51. In a machine tool, in combination, a bed, a carriage movably mounted thereon, a cam disk journaled on one of said parts and having cam slots on the opposite faces thereof, and a pair of rollers mounted on the other part and adapted to engage said cam slots successively and means for rotating the cam disk.

52. In a machine tool, in combination, a bed, a carriage movably mounted thereon, and means for moving said carriage comprising a cam disk journaled on the carriage and having cam slots on the opposite sides thereof, one of said cam slots having a dwell portion adjacent the center of the wheel and an accelerating portion extending through approximately 180° from said dwell portion to the periphery, the other slot having a dwell portion adjacent its periphery and an approximately 180° accelerating portion extending towards the center of the cam, means mounted on said bed arranged to engage said cam slots successively and means for rotating the cam disk in opposite directions.

53. In a machine tool, in combination, a bed, a support movably mounted thereon, a cam disk rotatably mounted on one of said members and having a pair of counter-positioned cam slots thereon, a pair of followers mounted on the other member arranged to engage said cam slots successively during a movement of the support in one direction, and means to rotate said disk in opposite directions.

54. In a machine tool, in combination, a bed, a support movably mounted thereon, and a driving means for said support comprising cam means mounted on one of said members and including a pair of cams, a pair of followers mounted on the other member arranged to engage said cams successively to cause movement of the support on the bed greater than the movement of one of the followers by one of the cams and means to drive said cam means.

In testimony whereof, I have hereunto affixed my signature.

ERNEST J. SVENSON.